Figure 1:
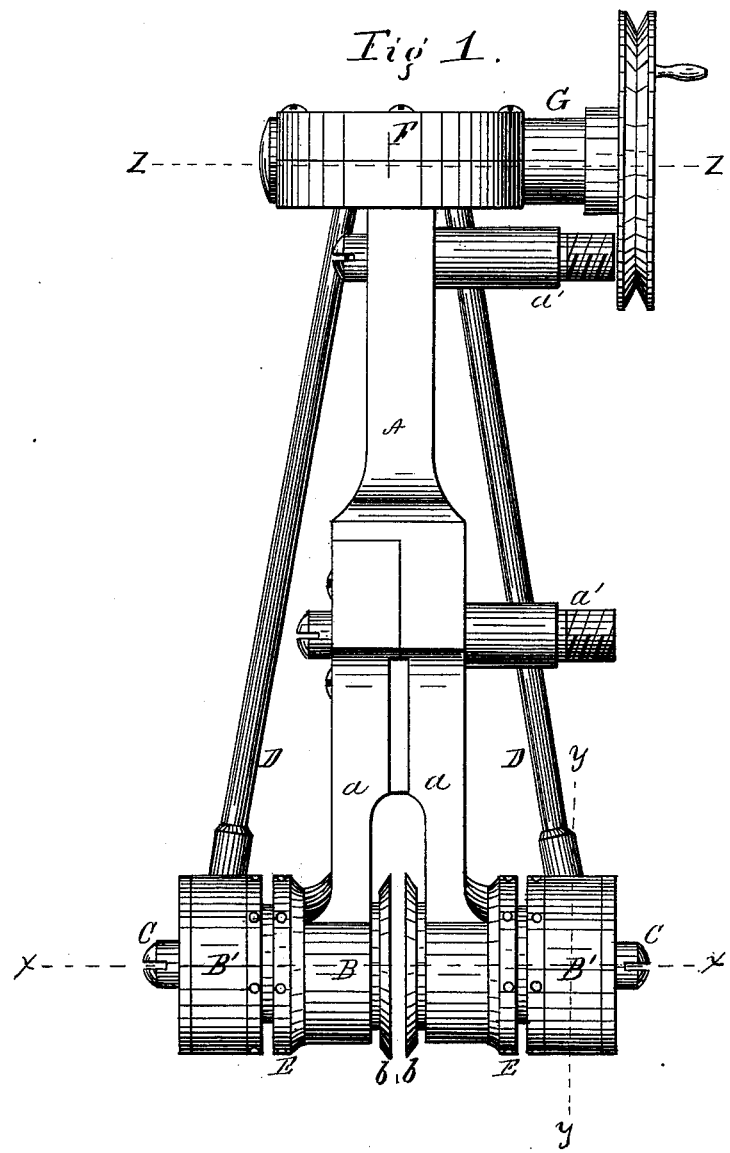
Figure 2:
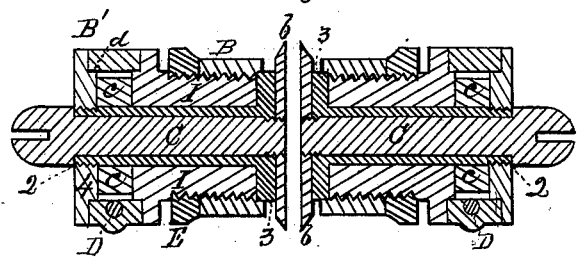
Figure 3:
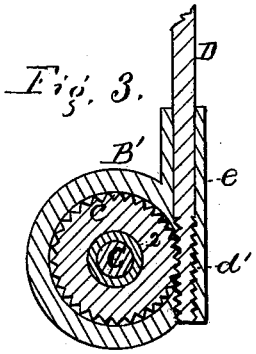
Figure 4:
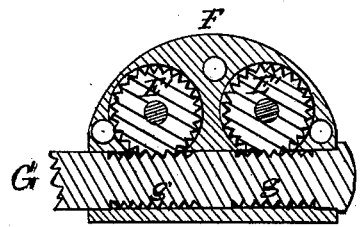

2 Sheets—Sheet 2.

J. M. GODDARD.
RATTAN-MACHINE.

No. 175,071. Patented March 21, 1876.

WITNESSES:
Phil. W. Hale
David G. Weems

INVENTOR:
Joseph Myron Goddard
per attys
A. H. Evans & Co.